United States Patent [19]
Hoffmann et al.

[11] Patent Number: 6,069,220
[45] Date of Patent: May 30, 2000

[54] CONTINUOUS METHOD FOR PRODUCING POLYORGANOSILOXANES

[75] Inventors: Sabine Hoffmann, Radebeul; Klaus Kaeppler, Dresden, both of Germany

[73] Assignee: Huels Silicone GmbH, Nuenchritz, Germany

[21] Appl. No.: 09/225,237

[22] Filed: Jan. 4, 1999

[30] Foreign Application Priority Data

Jan. 2, 1998 [DE] Germany .......................... 198 00 023

[51] Int. Cl.⁷ .................................................. C08G 77/06
[52] U.S. Cl. ................................ 528/12; 528/31; 528/32; 528/33; 528/34; 528/39
[58] Field of Search .................................. 528/12, 31, 32, 528/33, 34, 39; 524/837, 858

[56] References Cited

U.S. PATENT DOCUMENTS 3,668,180  6/1972  Brennan et al. .
4,609,752  9/1986  Giesing et al. .......................... 556/457
5,223,636  6/1993  Koshimura et al. ..................... 556/457
5,391,673  2/1995  Ekeland et al. ........................... 528/12

FOREIGN PATENT DOCUMENTS 0 167 924  1/1986  European Pat. Off. .
0 495 676  7/1992  European Pat. Off. .
0 691 362  1/1996  European Pat. Off. .
228 550   10/1985  Germany .

*Primary Examiner*—Robert Dawson
*Assistant Examiner*—Jeffrey B. Robertson
*Attorney, Agent, or Firm*—Oblon, Spivak, McClelland, Maier & Neustadt, P.C.

[57] ABSTRACT

A continuous method for producing polyorganosiloxanes by multiple-step hydrolysis and condensation of alkoxysilanes in the presence of hydrogen chloride and/or of a compound that has at least one SiCl group, and an organic solvent immiscible with water.

10 Claims, 1 Drawing Sheet

CONTINUOUS METHOD FOR PRODUCING POLYORGANOSILOXANES

BACKGROUND OF THE INVENTION

1. Field of the Invention

This invention relates to a continuous method for producing polyorganosiloxanes by multiple-step hydrolysis and condensation of alkoxysilanes in the presence of hydrogen chloride and/or a compound that has at least one SiCl group and a solvent immiscible with water.

2. Description of the Background

The production of polyorganosiloxanes by hydrolysis of chlorosilanes or alkoxysilanes is known. Since the reaction rate of hydrolysis of chlorosilanes is greater than that of alkoxysilanes, the properties of the product can usually be controlled only with difficulty, and the reactions often end with the production of insoluble or useless end products.

To control the reactions, the chlorosilanes can be completely or partially alkoxylated and then hydrolyzed in a solvent immiscible with water. EP 691 362 describes a method in which alkoxysilanes with differing alkoxy groups are hydrolyzed.

The hydrolysis can be carried out continuously or discontinuously in homogeneous or heterogeneous phase, and using solvents miscible or immiscible with water. DD 228 550, for example, describes a continuous method for producing methyl resins starting with methylchlorosilanes. The drawback to this method consists of the fact that the hydrolysis products are of low molecular weight and have to be condensed in different ways, depending on their use.

Discontinuous methods have the advantage that during the hydrolysis and/or condensation reaction, the desired molecular weights or viscosities can be adjusted. However, the poor space-time yields are a drawback.

There is a need for an improved method for producing polyorganosiloxanes in a continuous and reproducible manner.

SUMMARY OF THE INVENTION

The invention provides a continuous method for producing polyorganosiloxanes from alkoxysilanes that reproducibly results in end products with definite properties, narrow molecular weight distributions, and a small high-molecular-weight fraction.

In particular, a continuous method is provided for producing polyorganosiloxanes in which in a first step at least one alkoxysilane with the general formula

    (I)

wherein R independently of one another represents substituted and/or unsubstituted, saturated and/or unsaturated hydrocarbon groups with 1 to 4 carbon atoms, or hydrogen, provided that only one hydrogen is bonded to each silicon, and $R^1$ independently of one another stands for saturated hydrocarbon groups with 1 to 4 carbon atoms, and x assumes values from 0 to 3, and/or its partial hydrolyzate, is reacted with about 0.25 to about 0.40 mole of water per alkoxy group in the presence of hydrogen chloride and/or a compound that has at least one SiCl group, and in the presence of a solvent immiscible with water, in homogeneous phase, and the reaction product obtained is reacted in a second step with about 0.25 to about 1.50 moles of water per alkoxy group based on the alkoxysilane with the general formula (I), in the presence of hydrogen chloride and/or a compound that has at least one SiCl group, and with the addition of more solvent immiscible with water, in heterogeneous phase, and the product obtained is washed in a third step intensively with water and the aqueous alcohol phase is then separated.

BRIEF DESCRIPTION OF THE DRAWINGS

The preferred embodiments of this invention will be described in detail, with reference to the following figures, wherein.

DETAILED DESCRIPTION OF PREFERRED EMBODIMENTS

Figure 1:
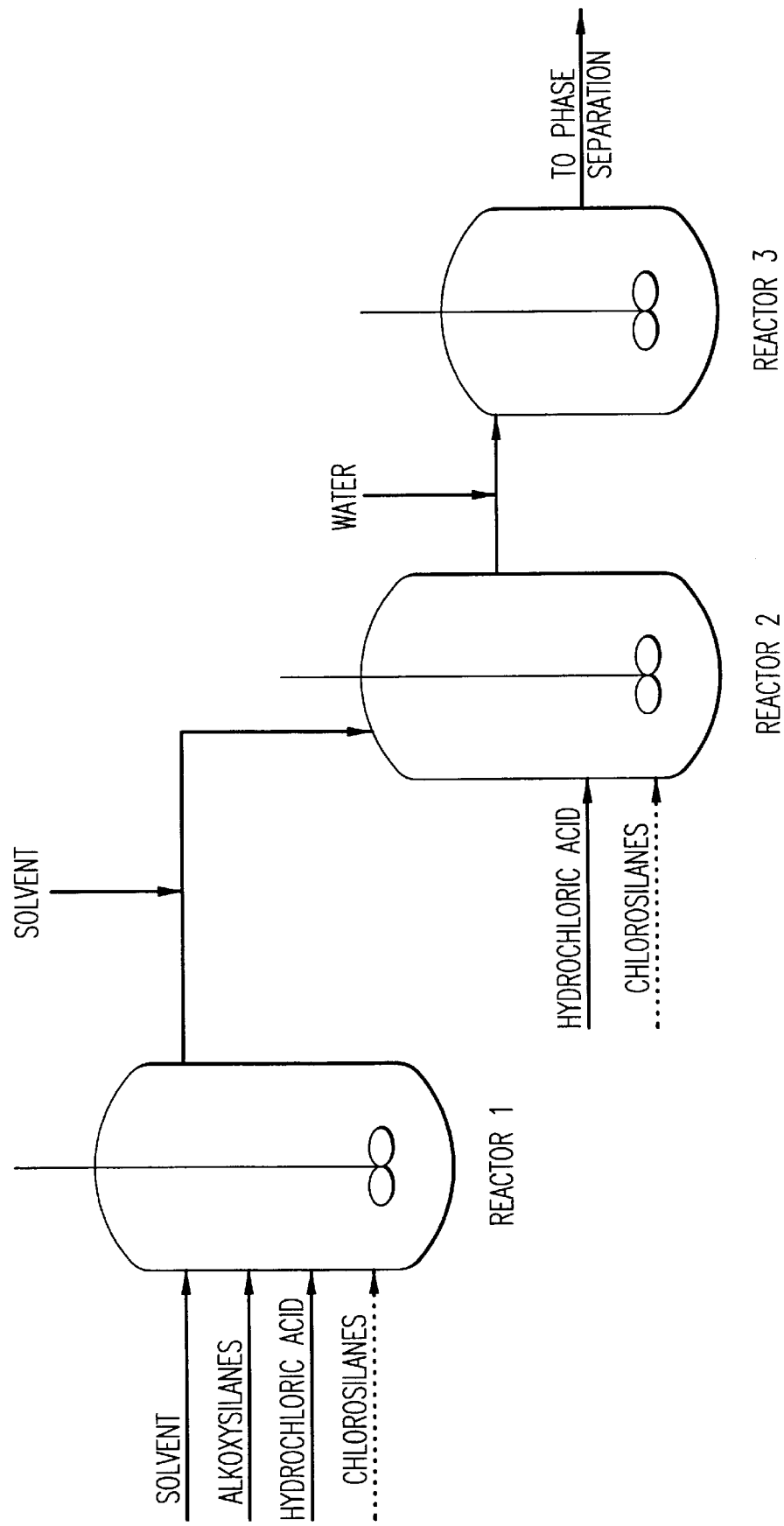
FIG. 1 is a flow diagram for the continuous production of organopolysiloxane.

The alkoxysilane with the general formula (I) can be trifunctional alkoxysilanes, such as methyltrialkoxysilanes, and/or difunctional alkoxysilanes, such as dimethyldialkoxysilanes, with methoxy or ethoxy groups being preferred as the alkoxy group. Alkoxysilanes that form Q-units, such as tetraalkoxysilanes, and/or monofunctional silanes, such as trialkylalkoxysilanes, in which the trialkylsilyl group is a trimethyl-, dimethylvinyl-, dimethylethyl-, chloromethyldimethyl-, and/or dimethylhydrogensilyl group, for example, can also be used. The ratio of the alkoxysilanes, i.e. their amounts and functionalities, depends on the desired end products and/or on their later use.

The first step is generally carried out in homogeneous phase, with the siloxane concentration preferably being about 10 to about 25 wt. % based on the homogeneous phase. The ratio by weight of alkoxysilane to solvent in this case is from about 1:0.55 to about 1:1.7.

The hydrogen chloride is usually dissolved in the necessary amount of water, in the form of hydrochloric acid, in both the first and second step. The hydrochloric acid can be added in solution in a solvent miscible with water, for example ethanol or acetone. It is preferred to add from about 0.25 to about 0.40 mole, especially from about 0.25 to about 0.33 mole, of water per alkoxy group in the first step in the form of concentrated hydrochloric acid. A compound that has at least one SiCl group can be used instead of hydrochloric acid, in which case hydrogen chloride is released when water is added. Alternatively, hydrochloric acid and silicon compounds that have SiCl groups can be added in combination. The total hydrogen chloride content of the reaction mixture after the first step is about 1 to about 5 wt. %, regardless of whether the HCl source is hydrochloric acid or the compound that has SiCl groups.

Additional organic solvent immiscible with water and a definite additional amount of water are added in the second step. According to the invention, the amount of water added is about 0.25 to about 1.50 moles, with this amount being based on the alkoxy groups contained in the alkoxysilanes with the general formula (I) that are used. For example, up to about 0.50 mole of water per alkoxy group can be used when a silicone resin solid at room temperature is to be produced, and more than about 0.50 mole per alkoxy group is preferred for the synthesis of resins that are liquid at room temperature. The procedure is carried out in heterogeneous phase, and the siloxane concentration in that case is preferably about 15 to about 25 wt. % based on the organic solvent phase. The water can be added similarly to the first step in the form of hydrochloric acid, for example containing about 10 to about 36 wt. % hydrogen chloride. In the same way as in the first step, however, it is also possible to use water and silicon compounds that have SiCl groups to achieve the necessary Cl concentration. Alternatively, hydrochloric acid and the compound with the general formula (II), below, can be fed in. The concentration of hydrogen chloride in the aqueous phase after the second step is usually about 5 to about 20 wt. %.

Toluene and/or xylene can be used in both steps as the organic solvent immiscible with water.

The reactions in the first and second steps are preferably carried out at temperatures between about 45 and about 60° C. up to reflux temperature. It is also possible to operate under pressure.

At least one compound with the general formula

$$R^2_x SiCl_{4-x} \quad (II)$$

can be added in the first and/or second step as the compound that has at least one SiCl group wherein $R^2$ independently of one another stands for a substituted and/or unsubstituted, saturated and/or unsaturated hydrocarbon group with 1 to 20 carbon atoms, or hydrogen, provided that only one hydrogen is bonded to each silicon, and x assumes values between 0 and 3. A total of about 0.5 to about 20 wt. % is preferably added, based on the alkoxysilane used in the first and/or second step.

It is possible by using compounds that have SiCl groups to minimize the amount of acid catalyst (hydrochloric acid) needed for the hydrolysis and/or condensation, and to replace it by SiCl groups that form hydrochloric acid in situ in the presence of water. However, since the concentration of SiCl groups in the starting mixture is low compared to the amounts of alkoxysilanes used, and the SiCl groups are accordingly distributed homogeneously, it is possible to keep the reaction under control.

Another advantage achieved by adding compounds with the general formula (II) is the definite addition of different functionalities, again depending on the desired end product and/or its later use. It is also possible to introduce units desired in the end product that could otherwise be incorporated only by an additional procedural step, for example equilibration, just by selective choice of the compounds that have SiCl groups used in the reaction mixture. The usual groups $R^2$ are methyl, vinyl, or ethyl groups. For example, trialkylchlorosilanes, silicon tetrachloride, and/or methylvinyldichlorosilane are used, in which the alkyl group can be long-chained and/or substituted. Other examples of the functional group $R^2$ are methyl, ethyl, vinyl, n-propyl, i-butyl, n-octane, hexadodecyl, cyclohexyl, cyclopentyl, 3-aminopropyl, 3-methacryloxypropyl, 3-glycidoxypropyl, 3-mercaptopropyl, or tridecafluorooctyl groups.

An advantageous embodiment of the method of the invention will be presented below with reference to FIG. 1.

The first step is carried out in a heated reactor 1 that is equipped with an intensive mixer unit, such as a very high-speed stirrer or a centrifugal pump; a reflux condenser; and temperature measurement device, such as a thermometer. Organic solvent immiscible with water, alkoxysilanes, hydrochloric acid, and chlorosilanes if desired, are added to this reactor 1 through infeed devices. It is sensible to feed all of the reactants into the bottom of the reactor, or if a centrifugal pump is used, into the pumped stream. It is also desirable for the alkoxysilanes in the mixture to be fed in with the solvent used. The chlorosilanes are either fed in separately or are added with the alkoxysilanes or the solvent.

The hydrochloric acid should contain about 36 wt. % hydrogen chloride, and it is preferred to use toluene and/or xylene as the solvent. It is possible to mix the hydrochloric acid with a water-miscible solvent such as ethanol or acetone prior to adding it. If ethanol is used, for example, it can be mixed with 1 to 2 times its weight of solvent. About 0.25 to about 0.40 mole, preferably up to about 0.33 mole, of water is added in the form of concentrated hydrochloric acid, based on the alkoxy groups. Partial hydrolysis occurs in this first step. The reaction takes place in homogeneous phase, usually at temperatures between about 45 and about 60° C. up to reflux temperatures. The siloxane concentration in the reaction mixture is preferably about 10 to about 25 wt. %. The average dwell time in the first step is about 15 to about 90 minutes, preferably a maximum of about 50 min. The reaction product obtained then arrives at a reactor 2, which is equipped in the same way as reactor 1.

A further quantity of solvent is added to the reaction product from the first step, which can be done either prior to reactor 2 and/or in reactor 2. Hydrochloric acid, optionally dissolved in water-miscible solvent, and any chlorosilanes used are again fed into reactor 2, preferably again into the bottom or into the pumped stream. The reaction temperature is about 45 to about 60° C. and up to the reflux temperature. The average dwell time is about 15 to about 60 minutes, preferably a maximum of about 40 minutes. About 0.25 to about 1.50 moles of water is added, based on the alkoxy groups of the alkoxysilane used, preferably in the form of aqueous hydrochloric acid with about 10 to about 36 wt. % hydrogen chloride. The second step takes place in heterogeneous phase, i.e. the reaction mixture consists of a phase that has solvent, preferably containing about 15 to about 25 wt. % siloxane, and an aqueous alcohol hydrochloric acid phase.

The product that leaves the second step is washed intensively with water. After the washing, the siloxane phase containing solvent is separated from the aqueous alcohol phase.

The siloxane phase can then be subjected to a variety of further procedures. The concentration can be raised by removing the solvent by distillation, for example in a thin-film evaporator, and polyorganosiloxane solutions can thus be produced. Alternatively, the solvent can be removed entirely and solvent-free polyorganosiloxanes can thus be produced. The solvent-free polyorganosiloxane in this case can be in solid form, e.g. as flakes or as pellets, or it can be a liquid resin, for example if it contains D-units and/or long-chained alkyl groups bonded to silicon.

It is possible by the continuous method pursuant to the invention to reproducibly produce, starting with alkoxysilanes, polyorganosiloxanes with definite properties and with narrow molecular weight distributions. Thus, for example, without encountering problems associated with a high SiOEt content, products can be synthesized that are low-viscosity resin solutions and stable in storage. Alternatively, products with low SiOEt and high SiOH contents can be synthesized that are solid resins at room temperature with melting points >45° C. Products can be obtained that have only a small high-molecular-weight fraction and that thus provide low viscosities and very good storage stability.

By selective choice of compounds with SiCl groups in the first and/or second steps, it is also possible to incorporate groups in the resin that could otherwise be incorporated only by additional procedural steps, for example equilibration, and thus to adjust a number of end product characteristics.

The products prepared by the continuous method pursuant to the invention, among other uses, can be used to produce mica insulations and to make electrolytic magnesia hydrophobic in the electrical industry, and for producing emulsions, for example for structural protection. The polyorganosiloxanes that are liquid at room temperature are particularly suitable for producing emulsions.

EXAMPLES

The production of methylsilicone resin by multiple-step hydrolysis/condensation according to the invention is summarized in Examples 1–13 in Table 1 below.

In Examples 1–13, the first step is carried out in homogeneous phase. The course of the hydrolysis and/or condensation reaction in the first and second steps is determined according to criteria set by the specifications (SiOH and SiOEt contents and high-molecular-weight fraction) for the resin solution concentrates containing 65 to 75 wt. % siloxane obtained after partial removal of solvent from the products obtained after the third step.

It is apparent from Examples 1–13 that a number of possible variations are possible with the method according to the invention, to adjust to specific end product characteristics. Thus, the products of Examples 8 and 9 provide solid resins with melting points of 46 and 48° C., respectively. Additions of Q-units (see Examples 10 and 11) raise the melting points.

The high-molecular-weight fraction is determined by gel permeation chromatography (GPC). Constituents with molecular weights greater than 6,500 g/mole (polystyrene standard) are determined.

In the comparative example (Comp*) in Table 1, the hydrolysis/condensation was carried out in one step in heterogeneous phase in reactor 1, and the reaction mixture was then washed and separated into the organic siloxane phase and the aqueous alcohol phase.

Table 1 shows that Examples 1–13 result in relatively narrow molecular weight distributions in which the high-molecular-weight fraction is less than or equal to the 0 wt % high-molecular-weight fraction of Example 1. In contrast, the comparative example results in a relatively broad molecular weight distribution with a high-molecular-weight fraction of 25 wt. %. It is not possible with a one-step hydrolysis/condensation process to obtain the products having a narrow molecular weight distribution and a small high-molecular-weight fraction that are obtained according to the present invention.

TABLE 1

| Example No. | First Step | | | | | | Second Step | | | | |
|---|---|---|---|---|---|---|---|---|---|---|---|
| | T (° C.) | MTES (ml/h) | Toluene (ml/h) | HCl (ml/h) | DT (min) | mol H$_2$O/ mol SiOEt | T (° C.) | Toluene (ml/h) | HCl (ml/h) | DT (min) | mol H$_2$O/ mol SiOEt |
| 1 | 60 | 945.6 | 728.1 | 126.2[1] | 40 | 0.37 | 60 | 728.1 | 126.2[1] | 27 | 0.37 |
| 2 | 40 | 945.6 | 728.1 | 126.2[1] | 40 | 0.37 | 40 | 728.1 | 126.2[1] | 27 | 0.37 |
| 3 | 60 | 945.6 | 728.1 | 126.2[1] | 40 | 0.37 | 60 | 728.1 | 340.7[1] | 25 | 1.0 |
| 4 | 60 | 945.6 | 728.1 | 126.2[1] | 40 | 0.37 | 60 | 728.1 | 511.1[1] | 24 | 1.5 |
| 5 | 60 | 945.6 | 728.1 | 85.3[1] | 40 | 0.25 | 60 | 728.1 | 102.3[1] | 27 | 0.3 |
| 6 | 60 | 945.6 | 728.1 | 100.2[2] | 40 | 0.37 | 60 | 728.1 | 100.2[2] | 28 | 0.37 |
| 7 | 60 | 945.6 | 728.1 | 107.5[3] | 40 | 0.37 | 60 | 728.1 | 107.5[3] | 27 | 0.37 |
| 8 | 60 | 910 | 680 | 120.1[4] | 39 | 0.37 | 60 | 680 | 120.1[4] | 26 | 0.37 |
| 9 | 60 | 852 | 637 | 112.5[3] | 39 | 0.37 | 60 | 637 | 112.5[3] | 26 | 0.37 |
| 10 | 60 | 869.6[6] | 739.2 | 133.3[1] | 40 | 0.37 | 60 | 739.2 | 133.3[1] | 27 | 0.37 |
| 11 | 60 | 860[7] | 718.1 | 129.2[1] | 40 | 0.37 | 60 | 718.1 | 129.2[4] | 27 | 0.37 |
| 12 | 50 | 780[8] | 770 | 80.7[1] | 50 | 0.25 | 50 | 770 | 96.8[1] | 40 | 0.3 |
| 13 | 60 | 950[9] | 650 | 118.5[1] | 38 | 0.33 | 60 | 650 | 118.5[1] | 25 | 0.33 |
| Comp.* | 50 | 939.6 | 1,447.3 | 250[1] | 40 | 0.74 | | | | | |

| | Third Step | | | Result | | | |
|---|---|---|---|---|---|---|---|
| | T (° C.) | H$_2$O (ml/h) | DT (min) | Mw (g/mol) | SiOH (wt. %) | SiOEt (wt. %) | HM (wt. %) |
| 1 | 39 | 700 | 27 | 4,649 | 2.0 | 8.3 | 10 |
| 2 | 32 | 1,000 | 25 | 2,421 | 2.3 | 10.0 | 5 |
| 3 | 38 | 1,500 | 21 | 3,857 | 1.9 | 7.4 | 8 |
| 4 | 38 | 1,500 | 20 | 2,673 | 2.1 | 7.0 | 5 |
| 5 | 39 | 1,000 | 25 | 1,740 | 0.9 | 16.1 | 3 |
| 6 | 38 | 1,500 | 22 | 1,881 | 2.8 | 6.8 | 3 |
| 7 | 34 | 1,000 | 25 | 3,113 | 2.3 | 8.8 | 6 |

TABLE 1-continued

| | | | | | | | |
|---|---|---|---|---|---|---|---|
| 8 | 35 | 720 | 26 | 3,694 | 2.2 | 6.2 | 7 |
| 9 | 35 | 720 | 26 | 2,780 | 2.5 | 7.6 | 6 |
| 10 | 34 | 1,500 | 22 | 3,712 | 2.0 | 10.4 | 8 |
| 11 | 35 | 1,500 | 22 | 2,062 | 2.2 | 9.2 | 4 |
| 12 | 29 | 1,000 | 20 | 2,600 | 0.6 | 12.8 | 5 |
| 13 | 37 | 1,000 | 30 | 1,958 | 1.5 | 8.3 | 4 |
| Comp.* | 32 | 1,500 | 25 | 7,770 | 0.8 | 14.0 | 25 |

MTES: Methyltriethoxysilane
HM: High-molecular-weight fraction determined by GPC
DT: Dwell time
Key to of Table 1
1) Hydrochloric acid used with 36.5 wt. % hydrogen chloride
2) Hydrochloric acid used with 10.0 wt. % hydrogen chloride
3) Hydrochloric acid used with 20.0 wt. % hydrogen chloride
4) Hydrochloric acid diluted 1:1 with ethanol (volume ratio) used
5) Hydrochloric acid diluted 1:2 with ethanol (volume ratio) used
6) 10 wt. % silicon tetrachloride added, based on MTES
7) 10 wt. % tetraethoxysilane added, based on MTES
8) 10 wt. % dimethyldichlorosilane and 5 wt. % octyltrichlorosilane added, based on MTES
9) 5 wt. % vinyltriethoxysilane added, based on MTES While the present invention has been described with reference to specific embodiments, it is not confined to the specific details set forth, but is intended to convey such modifications or changes as may come within the skill in the art.

The disclosure of each of the references cited above is incorporated herein by reference in its entirety.

What is claimed is:

1. A continuous method for producing polyorganosiloxanes characterized by the fact that in a first step at least one alkoxysilane with a general formula

$$R_xSi(OR^1)_{4-x} \qquad (I)$$

wherein R independently of one another represents a substituted and/or unsubstituted, saturated and/or unsaturated hydrocarbon group with 1 to 4 carbon atoms, or hydrogen, provided that only one hydrogen is bonded to each silicon, and $R^1$ independently of one another stands for a saturated hydrocarbon group with 1 to 4 carbon atoms, and x assumes values from 0 to 3, and/or its partial hydrolyzate, is reacted with about 0.25 to about 0.40 mole of water per alkoxy group in a presence of hydrogen chloride and/or a first compound that has at least one SiCi group, and in a presence of a solvent immiscible with water, in a homogeneous phase, to form a first reaction product, and in a second step the first reaction product is reacted with about 0.25 to about 1.50 moles of water per alkoxy group based on the alkoxysilane with the general formula (I), in the presence of hydrogen chloride and/or a second compound that has at least one SiCl group, and with additional solvent immiscible with water, in a heterogeneous phase comprising an organic solvent phase, to form a second reaction product, and in a third step the second reaction product is washed with water and an aqueous alcohol phase is then separated.

2. The method according to claim 1, characterized by the fact that the presence of hydrogen chloride and the water is provided by hydrochloric acid.

3. The method according to claim 2, characterized by the fact that the hydrochloric acid is dissolved in a solvent miscible with water.

4. The method according to claim 1, characterized by the fact that the water in the first step is provided by concentrated hydrochloric acid.

5. The method according to claim 1, characterized by the fact that a hydrogen chloride content of the first reaction product is about 1 to about 5 wt. %.

6. The method according to claim 1, characterized by the fact that at least one of the first compound and the second compound, which both have at least one SiCl group, conforms to the general formula

$$R^2_xSiCl_{4-x} \qquad (II),$$

wherein $R^2$ independently of one another stands for a substituted and/or unsubstituted, saturated and/or unsaturated hydrocarbon group with 1 to 20 carbon atoms, or hydrogen, provided that only one hydrogen is bonded to each silicon, and x assumes values between 0 and 3.

7. The method according to claim 6, characterized by the fact that a total of about 0.5 to about 20 wt. % of the compound with the general formula (II), based on the alkoxysilane used, is provided in the first and/or second step.

8. The method according to claim 1, characterized by the fact that a siloxane concentration in the first step is about 10 to about 25 wt. %, based on the homogeneous phase.

9. The method according to claim 1, characterized by the fact that a siloxane concentration in the second step is about 15 to about 25 wt. %, based on the organic solvent phase.

10. The method according to claim 1, characterized by the fact that at least one of toluene and xylene is used as the solvent immiscible with water.

* * * * *